(12) United States Patent
Park

(10) Patent No.: US 7,135,122 B2
(45) Date of Patent: Nov. 14, 2006

(54) POLYTETRAFLUOROETHYLENE COMPOSITES

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 274 days.

(21) Appl. No.: 10/814,885

(22) Filed: Mar. 31, 2004

(65) Prior Publication Data

US 2005/0221038 A1  Oct. 6, 2005

(51) Int. Cl.
*B31D 3/00* (2006.01)
(52) U.S. Cl. ............................................... 216/56
(58) Field of Classification Search .............. 216/56, 216/33; 428/304.4, 306.6; 427/393.5
See application file for complete search history.

(56) References Cited

U.S. PATENT DOCUMENTS

| | | | |
|---|---|---|---|
| 4,483,951 A | 11/1984 | Brenner | |
| 4,564,662 A | 1/1986 | Albin | |
| 4,566,927 A | 1/1986 | Wood | |
| 4,849,040 A | 7/1989 | Wood | |
| 5,266,400 A | 11/1993 | Yarusso et al. | |
| 5,338,588 A | 8/1994 | Billiu | |
| 5,897,794 A | 4/1999 | Hubbard et al. | |
| 5,969,066 A | 10/1999 | Enokida et al. | |
| 6,482,522 B1 | 11/2002 | Parsonage et al. | |
| 6,517,657 B1 | 2/2003 | Kuenzel et al. | |
| 6,517,663 B1 | 2/2003 | Kelley et al. | |
| 6,652,943 B1 | 11/2003 | Tukachinsky et al. | |

OTHER PUBLICATIONS

Electron-Beam Curing of Polymeric Composites as an Enabling Technology for Advanced Manufacturing, E-BEAM Services, Inc.; Presented at the International Composites Expo '99 (ICE '99—Cincinnati, OH), May 10-13, 1999.
Electron-Beam Processing of Plastics: An Alternative to Chemical Additives, E-BEAM Services, Inc.; Presented at the 58th SPE Annual Technology Conference (ANTEC-2000; Orlando, Fla), May 11, 2000.
Kenji Nagai; Figure from "Technical Issues and Counter Measures for FKM"; "Industrial Material," pp. 62-65; vol. 44, No. 3, Mar. 1996.

*Primary Examiner*—Parviz Hassanzadeh
*Assistant Examiner*—Roberts Culbert
(74) *Attorney, Agent, or Firm*—Ronald Wangerow; Harness, Dickey, Pierce, P.L.C

(57) ABSTRACT

Composites of polytetrafluoroethylene and a structural material (polymer, metal, ceramic, leather, or wood) are bonded with a cured admixture of tetrafluoroethylene-hexafluoropropylene-vinylidene fluoride terpolymer, polyethylene-oxide-modified silicone polymer coupling agent, and oxygen-radical-containing copolymer (epoxy polymer, phenoxy polymer, or hydroxylated diamine-diepoxide derivative copolymer). The bonded surface of the polytetrafluoroethylene portion of the composite is etched (chemical etching, electron-beam etching, laser etching, or plasma etching) prior to application of uncured admixture. The composites are useful in making items such as seals, gaskets, chemically-resistant hoses, o-rings, and pump diaphragms.

19 Claims, No Drawings

US 7,135,122 B2

POLYTETRAFLUOROETHYLENE COMPOSITES

This invention relates to composites comprising polytetrafluoroethylene. In particular, the present invention relates to a composition for bonding polytetrafluoroethylene articles into composites, to methods for preparing a surface of a polytetrafluoroethylene article for use with a bonding composition, and to composites formed by use of bonding composition as coating upon the prepared surface of a polytetrafluoroethylene article.

Polytetrafluoroethylene materials are well known for their remarkably low adhesion to many items such as food, metal, and fluid materials. Polytetrafluoroethylene materials also provide benefits in chemically resistant surfaces and components. Teflon™ polytetrafluoroethylene (Dupont Corporation) and Halon™ polytetrafluoroethylene (Allied Chemical Corporation) are two well-established commercial/industrial product families in this regard.

While polytetrafluoroethylene is not fragile, its use must take into account a modest robustness in environments where mechanical stress is asserted against an article made from it. In this regard, polytetrafluoroethylene is frequently bonded to a structural material (such as steel) in items such as cookware. In many sealing applications, a polytetrafluoroethylene component is protectively mechanically pressed or held into a desired position without adhesive attachment to a structural material.

The innate challenge in bonding polytetrafluoroethylene to a structural material is the very property of polytetrafluoroethylene that makes it so useful—it doesn't "stick" to many materials. In one attempt to solve this problem, metals are adhered to polytetrafluoroethylene by chemically etching a surface of the polytetrafluoroethylene article and bonding the chemically etched surface of the polytetrafluoroethylene to the metal through use of a coupling agent (such as a silane coupling agent). However, there remains a need for effective methods for adhering metallic and non-metallic structural articles to polytetrafluoroethylene. These and other needs are achieved with the present invention.

SUMMARY

The invention provides a composite, comprising:
  (a) a polytetrafluoroethylene portion having an etched surface; and
  (b) a structural material portion (made of polymer, metal, ceramic, leather, or wood) bonded to the etched surface at an interface, the interface comprising a cured admixture of from about 10 to about 90 weight percent tetrafluoroethylene-hexafluoropropylene-vinylidene fluoride terpolymer, from about 0.01 to about 1 weight percent polyethylene-oxide-modified silicone polymer coupling agent, and an oxygen-radical-containing copolymer (an epoxy polymer, phenoxy polymer, or hydroxylated diamine-diepoxide derivative copolymer), and having less than about 5, preferably less than about 1, weight percent water In a further aspect, the invention provides an aqueous admixture of:
  (a) from about 10 to about 90 weight percent fluoropolymer aqueous emulsion having from about 20 to about 60 weight percent tetrafluoroethylene-hexafluoropropylene-vinylidene fluoride emulsified terpolymer, a pH from about 6 to about 10, a specific gravity from about 1.1 to about 1.5 grams per milliliter, and a viscosity from about 4 to about 12 Mega Pascal Seconds; and
  (b) oxygen-radical-containing copolymer aqueous solution in remainder, the oxygen-radical-containing copolymer aqueous solution having
    (1) from about 20 to about 60 weight percent of the oxygen-radical-containing copolymer with a softening temperature of from about 25 to about 180 degrees Centigrade, a specific gravity from about 1.1 to about 1.5 grams per milliliter, and an estimated equivalent molecular weight from about 100 to about 10,000, and
    (2) from about 0.01 to about 1 weight percent polyethylene-oxide-modified silcone polymer coupling agent having a wax melting temperature of from about 25 to about 50 degrees Centigrade.

In yet a further aspect of the invention, a method of making a composite is provided by:
  (a) admixing an aqueous admixture of from about 10 to about 90 weight percent of the above-described fluoropolymer aqueous emulsion with a remainder of the above-described oxygen-radical-containing copolymer aqueous solution;
  (b) etching a surface of a polytetrafluoroethylene article to provide an etched surface;
  (c) saturatively distributing the aqueous admixture onto the etched surface;
  (d) positioning a structural material article (polymer, metal, ceramic, leather, or wood) against the aqueous admixture on the etched surface so that the aqueous admixture fluidly fills an interface between the structural material article and the etched surface; and
  (e) curing the aqueous admixture in the interface to bond the structural material article to the etched surface.

In yet a further aspect of the invention, a method for etching an article made of polytetrafluoroethylene, is provided though:
  (a) generating a bombardment beam (using a plasma beam, an electron-beam, or a laser beam); and
  (b) etching a surface of the article with the bombardment beam, the bombardment beam energizing the surface with sufficient energy for dislodging a plurality of fluoride atoms from the polytetrafluoroethylene of the surface and thereby generating residual fluoroethylenic free radical moieties in polytetrafluoroethylene polymeric chains of the surface upon conclusion of the etching.

In various embodiments, the structural material is any of a polyester thermoplastic elastomer, polyamide thermoplastic elastomer, thermoplastic urethane elastomer, fluoroelastomer, ethylene acrylic rubber thermoplastic vulcanizate, acrylic acid ester rubber/polyacrylate rubber thermoplastic vulcanizate, silicone-thermoplastic vulcanizate, polyether-block co-polyamide polymer, ethylene-propylene-diamine monomer rubber/polypropylene thermoplastic vulcanizate, polyamide, polyester, polyolefin, polyphenylene-sulfide, polyether-ether ketone, polyamide-imide, polysulfone, thermoplastic urethane, acrylonitrile-butadiene-styrene, polyvinyl chloride, polymethylmethacrylate, polycarbonate, polybutene, cellulosic plastic, polyacrylate, a polyacetal, or a combination of these.

In one embodiment, an inert particulate is admixed in one of the above polymeric materials. This inert particulate is any of calcium carbonate, carbon black, graphite, silica fume, kaolin, magnetizable ferrite powder, metal fiber, carbon nanotubes, carbon fiber, glass fiber, fiberglass fiber, microspheres, polyimide powder, molybdenum sulfide powder, brass powder, or a combination of these materials.

In one embodiment, the structural material is a metal such as steel, carbon steel, stainless steel, or aluminum.

In one embodiment, the polytetrafluoroethylene surface is prepared by sodium-ammonia solution etching or sodium-naphthalene solution etching.

In one embodiment, the structural material portion is bonded to the etched surface by use any of calendaring, pultrusion, multilayer extrusion, or co-injection molding.

In one embodiment, a composite according to the above (or made by the above) is a seal, a gasket, an o-ring, a hose for chemical and/or fuel handling, or a diaphragm in a diaphragm pump.

Further areas of applicability will become apparent from the detailed description provided hereinafter. It should be understood that the detailed description and specific examples, while indicating embodiments of the invention, are intended for purposes of illustration only and are not intended to limit the scope of the invention.

DESCRIPTION

The following definitions and non-limiting guidelines must be considered in reviewing the description of this invention set forth herein.

The headings (such as "Introduction" and "Summary") and sub-headings (such as "Amplification") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

In many situations, the design of a composite material reflects both mechanical design and materials design considerations. In this regard, improvements in materials frequently are intertwined with improvements in mechanical design. Embodiments of the present invention include approaches to making composites that enable improvements in material design to be fully exploited by enabling manufacture of a composite where a portion made of polytetrafluoroethylene (PTFE) is comprehensively bonded to a structural material in the composite. Furthermore, embodiments describe an approach to bonding admixture manufacture and polytetrafluoroethylene surface preparation that enable improvements in material design to be fully exploited by providing the materials and techniques needed to achieve the new composites.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

Respective to nomenclature, unless reasonably clear from the context of usage, the terms "polymer", "plastic", and "resin" are generally used in essentially overlapping reference to organic materials of large molecular weight. In this regard, the term polymer may apply either to a single molecule, to a material predominantly composed of randomly intermixed individual polymer molecules, or to a significantly distinguished polymeric molecular type dispersed within a medium (such as in an emulsion).

Without limiting the mechanism, composition or utility of the present invention, Essentially, a bonding material for adhering an item made of PTFE to another structural item (to a second item made of non-PTFE polymer, leather, wood, ceramic, or metal) provides a "handle" to "link" with free radical bonds in the PTFE surface to be bonded. The number of these free radical bonds in the PTFE surface can be dramatically increased if the surface is etched to remove a substantial proportion of the fluorine radicals from the PTFE chains in the surface. The bonding material also provides a "handle" that links to the (second) structural material; this is usually less difficult than linking to PTFE because most structural materials have enough surface tension to "stick" to at least some generally adhesive polymers. Finally, the bonding material needs to be internally coherent so that the "handles" to the PTFE part of the composite and the "handles" to the structural material part of the composite are themselves held directly or indirectly in close proximity. Since the bonding material is generally spread as a coating onto the components to be joined into the composite, it is convenient for the bonding material to be in the initial form of a liquid having a viscosity that facilitates the spreading or coating operation.

In one embodiment, the structural material portion of a composite (the structural material article made of non-PTFE polymer, wood, leather, ceramic, or metal) is bonded to an etched surface of the PTFE portion of the composite (the PTFE article) at an interface essentially filled with cured admixture of from about 10 to about 90 weight percent (preferably from about 20 to about 60 weight percent; more preferably about 50 weight percent) tetrafluoroethylene-hexafluoropropylene-vinylidene fluoride terpolymer, from about 0.01 to about 1 weight percent polyethylene-oxide-modified silicone polymer coupling agent, not more than about 5 weight percent water, and a remainder of oxygen-radical-containing copolymer. Preferably the interface comprises less than one percent water. In this regard, the oxygen-radical-containing copolymer has at least one "oxy" or —O— radical (oxygen atom radical having 2 bonds attached to two respective other atoms) in the characteristic polymer molecule. In this regard, the oxygen-radical-containing copolymer molecule is, in one embodiment, a cured epoxy polymer or cured phenoxy where the "oxy" radical provides a link between two other carbon atoms in the polymer chain. In another embodiment, the oxygen-radical-containing copolymer is a hydroxylated diamine-diepoxide derivative copolymer molecule, where the "oxy" radical is in hydroxyl radicals of the polymer chain. In such a copolymer molecule, each of the two nitrogen radicals of a diamine is, for example, connected to two separate hydroxylated carbon chain moieties in the general matrix of the crosslinked polymer macromolecule.

The cured admixture (of from about 10 to about 90 weight percent tetrafluoroethylene-hexafluoropropylene-vinylidene fluoride terpolymer, from about 0.01 to about 1 weight percent polyethylene-oxide-modified silicone polymer coupling agent, not more than about 5 weight percent water, and a remainder of oxygen-radical-containing copolymer) results from dewatering and curing of an aqueous admixture that was coated onto the etched surface and then cured. This aqueous admixture is admixed from about 10 to about 90 weight percent (preferably from about 20 to about 60 weight percent; more preferably about 50 weight percent) fluoropolymer aqueous emulsion and a remainder of oxygen-radical-containing copolymer aqueous solution.

The fluoropolymer aqueous emulsion has from about 20 to about 60 weight percent (preferably from about 46.5 to about 51.5 weight percent) tetrafluoroethylene-hexafluoropropylene-vinylidene fluoride emulsified terpolymer, a pH from about 6 to about 10 (preferably from about 8 to about 9), a specific gravity from about 1.1 to about 1.5 grams per milliliter, and a viscosity from about 4 to about 12 Mega Pascal Seconds (preferably from about 9 to about 10 Mega Pascal Seconds). One source of this is THV Fluorothermoplastic from Dyneon LLC (Oakdale, Minn.) under the product identifier THV-350C. THV-350C provides fluoropolymer aqueous emulsion having tetrafluoroethylene-hexafluoropropylene-vinylidene fluoride terpolymer from about 46.5 to about 51.5 weight percent, a pH from about 8 to about 9, and a viscosity from about 9 to about 10 Mega Pascal Seconds.

Turning now to the oxygen-radical-containing copolymer aqueous solution with is admixed with the fluoropolymer aqueous emulsion to form the aqueous admixture, the oxygen-radical-containing copolymer aqueous solution has (1) from about 20 to about 60 weight percent oxygen-radical-containing copolymer having a softening temperature of from about 25 to about 180 degrees Centigrade (preferably from about 65 to about 155 degrees Centigrade), a specific gravity from about 1.1 to about 1.5 grams per milliliter, and an estimated equivalent molecular weight from about 100 to about 10,000 (preferably from about 450 to about 3000), The oxygen-radical-containing copolymer is, in various embodiments, any of an epoxy polymer, a phenoxy polymer, or a hydroxylated diamine-diepoxide derivative copolymer, and (2) from about 0.01 to about 1 weight percent (preferably from about 0.05 to about 0.5 weight percent) polyethylene-oxide-modified silcone polymer coupling agent having a wax melting temperature of from about 25 to about 50 degrees Centigrade (preferably from about 25 to about 45 degrees Centigrade).

One embodiment of an epoxy-polymer-based oxygen-radical-containing copolymer aqueous solution is Chemlock™ aqueous epoxy silane solution from Lord Corporation. Another embodiment is made by blending an epoxy resin (such as any of GT 7071, GT 7072, GT 7014, GT 6097, or GT 6609 epoxy resins from Ciba Corporation) with CoatOSil™ 2400 polyethylene-oxide modified silicone copolymer coupling agent from Crompton Corporation. Estimated equivalent molecular weights for GT 7071, GT 7072, GT 7014, GT 6097, and GT 6609 epoxy resins vary progressively from about 450 (GT 7071) to about 2,800 (GT 6609).

In other embodiments, the oxygen-radical-containing copolymer is alternatively a hydroxylated diamine-diepoxide derivative copolymer or a phenoxy. In the case of a phenoxy, the estimated equivalent molecular weight is as high as 10,000. In each embodiment of a composite, the particular physical properties of the oxygen-radical-containing copolymer and polyethylene-oxide-modified silcone polymer coupling agent are pinpointed to provide efficacy with the particular material used for the support component.

In alternative embodiments, the structural material portion respectively is made of a polymer of any of polyester thermoplastic elastomer (such as Dupont's Hytrel™ polyester elastomer), polyamide thermoplastic elastomer (such as Atofina's Pebax™ polyamide thermoplastic elastomer), thermoplastic urethane elastomer, fluoroelastomer, ethylene acrylic rubber thermoplastic vulcanizate (such as a Dupont experimental AEM-TPV also commonly known as ETPV), acrylic acid ester rubber/polyacrylate rubber thermoplastic vulcanizate (such as Zeon Chemical's Zeotherm™ acrylic acid ester rubber/polyacrylate rubber thermoplastic vulcanizate), silicone-thermoplastic vulcanizate (such as a Dow Corning experimental VMQ-TPV also commonly known as TPSiV), polyether-block co-polyamide polymer (such as Modified Polymer Components' Pebax™ polyether-block co-polyamide resin), ethylene-propylene-diamine monomer rubber/polypropylene thermoplastic vulcanizate (such as Advanced Elastomeric System's Santoprene™ vulcanizate), polyamide, polyester, polyolefin, polyphenylene-sulfide, polyether-ether ketone, polyamide-imide, polysulfone, thermoplastic urethane, acrylonitrile-butadiene-styrene, polyvinyl chloride, polymethylmethacrylate, polycarbonate, polybutene, cellulosic plastic, polyacrylate, or polyacetal. Polymers made of combinations of these are used in other embodiments.

In alternative embodiments, inert particulate is admixed with the polymer. These inert particulates are preferably selected from the group consisting of calcium carbonate, carbon black, graphite, silica fume, kaolin, magnetizable ferrite powder, metal fiber, carbon nanotubes, carbon fiber, glass fiber, fiberglass fiber, microspheres, polyimide powder, molybdenum sulfide powder, brass powder, and mixtures thereof. Polymers having combinations of these additives are used in other embodiments.

In yet further embodiments, the structural material portion is made of any of steel, carbon steel, stainless steel, or aluminum.

Turning now to the process by which a polytetrafluoroethylene portion and a structural material portion are bonded together into a composite, a surface of the polytetrafluoroethylene portion (article) is etched to generate residual fluoroethylenic free radical moieties in polytetrafluoroethylene polymeric chains of the surface. This is achieved in one embodiment by chemical etching, and, in another embodiment, the etching is achieved with a beam bombardment approach. In the case of chemical etching, sodium-ammonia solution etching or sodium-naphthalene solution etching is used. In the case of beam bombardment, any of plasma bombardment etching, electron-beam etching, and laser etching is used.

In beam bombardment embodiments, any of a plasma beam, an electron-beam, or a laser beam is generated and then applied to the PTFE surface with sufficient energy for dislodging a plurality of fluoride atoms from the polytetrafluoroethylene of the surface so that residual fluoroethylenic free radical moieties are generated in polytetrafluoroethylene polymeric chains of the surface.

After the surface is etched, an embodiment of an aqueous admixture as described above is saturatively distributed onto the etched surface. Saturative distribution of the aqueous admixture involves both coating the aqueous admixture on the generally etched surface and then, very importantly, providing conditions to enable the aqueous admixture to comprehensively penetrate to achieve contact with the available bonds of the residual fluoroethylenic free radical moieties generated by the etching. In this regard, the aqueous admixture, in one embodiment, is heated; in another embodiment, the aqueous admixture is pressurized against the etched surface; in yet another embodiment, the aqueous admixture is pressurized against the etched surface and also heated.

In one embodiment, the aqueous admixture is coated on the etched surface to provide an aqueous admixture coating having from about 0.0005 to about 0.01 inches thickness (preferably from about 0.0005 to about 0.005 inches thickness). The aqueous admixture coating is then pressurized against the etched surface (in one embodiment by "squeezing" the aqueous admixture between the PTFE surface and the structural material portion) for at least 3 minutes at from about 0.5 to about 10 pounds per square inch pressure and from about 25 to about 100 degrees Centigrade temperature.

The solids content of the admixture is preferably at least about 1%, preferably from about 10% to about 90%, preferably from about 20% to about 50% by weight of admixture. The solids content may be adjusted, as necessary, before or after coating in the etched surface. In one embodiment, the water in the aqueous admixture is diminished as a result of heat and pressure application over time in the saturative distribution operation. In an alternative embodiment a process such as vacuum evaporation is used to diminish water after the saturative distribution operation.

If the structural material portion has not yet been positioned against the residual dewatered aqueous admixture, it is now so positioned. In this regard, the structural material article is positioned against the (residual, if dewatered) aqueous admixture on the etched surface so that the aqueous admixture fluidly fills the interface between the structural material article and the etched surface.

The residual dewatered aqueous admixture (aqueous admixture having at least about 1 weight percent solids) coating is then cured. In this regard, tetrafluoroethylene-hexafluoropropylene-vinylidene fluoride terpolymer has a melting temperature and the etched surface and residual aqueous admixture on the etched surface are heated to at least that melting temperature for a time sufficient for curing the various polymers so that they bond to both the PTFE portion and the structural material portion of the composite.

In one embodiment, cured admixture is achieved by heating under pressure such that the etched surface and the residual (dewatered) aqueous admixture on the etched surface are sustained at temperature of at least 190 degrees Centigrade and at a pressure of at least 75 pounds per square inch for a time period of at least 10 minutes.

In alternative embodiments, positioning of the structural material portion against the residual dewatered aqueous admixture is achieved by various respective processes. Traditional processes such a calendaring, pultrusion, multilayer extrusion, and co-injection molding are used in alternative process embodiments to achieve manufacture of the desired composite. In the case of calendaring, the positioning and dewatering steps are substantively combined and then pressure and temperature are further adjusted to effect curing and bonding.

In one embodiment of pultrusion, a PTFE pipe-form is etched and then coated with the aqueous admixture, the aqueous admixture is saturatively distributed in a pressure chamber, the water is adjusted (removed) through vacuum distillation, and the PTFE pipe-form with saturatively distributed and dewatered residual aqueous admixture is propelled through a pultrusion die to acquire an outside coating of (polymeric) structural material which is then cured along with the curing of the admixture.

In one embodiment of co-injection molding, a PTFE article is coated with the aqueous admixture, the aqueous admixture is saturatively distributed in a pressure chamber, the water is adjusted (removed) through vacuum distillation, and the PTFE article with saturatively distributed and dewatered residual aqueous admixture is placed into an injection mold. Structural material is then injected against the residual aqueous admixture and held under pressure until both it and the residual aqueous admixture have cured.

One application of the embodiments is for making a seal for a rotating shaft. A composite of PTFE and Hytrel™ polyester are joined into a composite according to the above, and a contact surface for contacting the shaft in dynamic rotation is machined into the PTFE portion of the composite. In operation, the Hytrel™ polyester structurally stabilizes the composite as the PTFE shaft contact surface lightly bears against the rotating shaft.

A second application of the embodiments if for making a laminate diaphragm for a diaphragm pump with a robust laminar sheet being bonded to a PTFE sheet. In operation, the polytetrafluoroethylene article provides a contact surface for interfacing to fluid pumped by the pump, and the robust laminar sheet provides dimensional strength to protect the PTFE sheet from stretching or tearing.

Yet other applications are for gaskets, o-rings, and items such as a hose for handling chemicals or fuels where the inner lining of the hose has the chemical resistance properties of a PTFE "lining".

EXAMPLES

A mixture of THV emulsion (Dyneon THV-340C) in aqueous base and epoxy-based aqueous silane solution is formulated to evaluate bonding of etched PTFE and Hytrel™ type TPE (2022HS grade, polyester-based TPE from DuPont) samples. The epoxy-based aqueous silane solution is prepared by combining epoxy resin (Vantico™ GT grades from Ciba) and polyethylene oxide (PEO) modified silicone copolymer as a coupling agent for the silicone to the epoxy. The 50/50 (on a weight basis) mixture of THV emulsion and epoxy-based silicone solution is applied both to a surface of etched PTFE and to a surface of a Hytrel™ sample. Eight samples of etched PTFE specimens independently etched either by chemical means (sodium ammonia and sodium naphthalene) or by physical mean (plasma) on the bonding surface of PTFE are prepared.

Application of wet adhesive is controlled to provide a total (wet) adhesive layer thickness of about 1.5 mils between the etched PTFE and Hytrel™ surfaces after they are combined into a composite sample.

Each (composite) PTFE-adhesive-TPE sample is placed in a 60 degrees C. oven with a 5 lb weight on top of the combined part for 5 minutes so that (1) the adhesive layer dries with the PTFE and Hytrel™ parts in position for the composite, and (2) the adhesive layer is uniformly distributed along the contours of the interfacing sample surfaces. Each composite sample is then placed between two heated plates, set at about 190° C., in a hydraulic press. A constant pressure of 75 psi is then applied to the composite part by the hydraulic press. The residence time in the press is at 75 psi and 190° C. is about 10 minutes.

Adhesion strength is tested manually using a "hand pull." The test results are summarized in Table 1. In interpreting the results of Table 1, a "Weak Bond" identifies a result where the composite separates at its interface in response to a relatively low impulse force against the bond; a "Partial Bond" identifies a result where the composite is robust under a steadily increased pull, but the composite separates when a strong acute impulse is exerted against the bond; a "Strong Bond" identifies a result where the composite is robust under both a steadily increased pull and a strong acute impulse. It is also to be noted that Sample A is a benchmark sample etched for a relatively brief time respective to the potential range of times normally used for sodium naphthalene etching of PTFE.

TABLE 1

| Sample | Etching Type | Etching Medium | Results |
| --- | --- | --- | --- |
| A | Chemical Etch | Sodium Naphthalene | Partial Bond |
| B | Chemical Etch | Sodium Ammonia | Partial Bond |
| C | Chemical Etch | Sodium Ammonia | Weak Bond |
| D | Chemical Etch | Sodium Ammonia | Partial Bond |
| E | Chemical Etch | Sodium Ammonia | Strong Bond |
| F | Chemical Etch | Sodium Ammonia | Partial Bond |
| G | Chemical Etch | Sodium Ammonia | Partial Bond |
| H | Physical Etch | Plasma Beam | Weak to Partial Bond |

Generally speaking, this adhesive formulation shows effectiveness in bonding sodium ammonia etched PTFE to Hytrel™ type TPE.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method of making a composite, comprising:
   (a) admixing an aqueous admixture of from about 10 to about 90 weight percent fluoropolymer aqueous emulsion and a remainder of oxygen-radical-containing copolymer aqueous solution;
   (b) etching a surface of a polytetrafluoroethylene article to provide an etched surface;
   (c) saturatively distributing said aqueous admixture onto said etched surface;
   (d) positioning a structural material article against said aqueous admixture on said etched surface so that said aqueous admixture fluidly fills an interface between said structural material article and said etched surface, said structural material portion made of a material selected from the group consisting of polymer, metal, ceramic, leather, and wood; and
   (e) curing said aqueous admixture in said interface to bond said structural material article to said etched surface;
   wherein said fluoropolymer aqueous emulsion has from about 20 to about 60 weight percent tetrafluoroethylene-hexafluoropropylene-vinylidene fluoride emulsified terpolymer, a pH from about 6 to about 10, a specific gravity from about 1.1 to about 1.5 grams per milliliter, and a viscosity from about 4 to about 12 Mega Pascal Seconds; and
   wherein said oxygen-radical-containing copolymer aqueous solution has
   (1) from about 20 to about 60 weight percent oxygen-radical-containing copolymer having a softening temperature of from about 25 to about 180 degrees Centigrade, a specific gravity from about 1.1 to about 1.5 grams per milliliter, and an estimated equivalent molecular weight from about 100 to about 10,000, wherein said oxygen-radical-containing copolymer is an oxygen-radical-containing copolymer selected from the group consisting of epoxy polymer, phenoxy polymer, and hydroxylated diamine-diepoxide derivative copolymer, and
   (2) from about 0.01 to about 1 weight percent polyethylene-oxide-modified silcone polymer coupling agent having a wax melting point of from about 25 to about 45 degrees Centigrade.

2. The method of claim 1 wherein said tetrafluoroethylene-hexafluoropropylene-vinylidene fluoride terpolymer has a melting temperature and said curing further comprises heating said etched surface and said aqueous admixture on said etched surface to a temperature of at least said melting temperature.

3. The method of claim 1 wherein said structural material article comprises a polymer selected from the group consisting of polyester thermoplastic elastomer, polyamide thermoplastic elastomer, thermoplastic urethane elastomer, fluoroelastomer, ethylene acrylic rubber thermoplastic vulcanizate, acrylic acid ester rubber/polyacrylate rubber thermoplastic vulcanizate, silicone-thermoplastic vulcanizate, polyether-block co-polyamide polymer, ethylene-propylene-diamine monomer rubber/polypropylene thermoplastic vulcanizate, polyamide, polyester, polyolefin, polyphenylene-sulfide, polyether-ether ketone, polyamide-imide, polysulfone, thermoplastic urethane, acrylonitrile-butadiene-styrene, polyvinyl chloride, polymethylmethacrylate, polycarbonate, polybutene, cellulosic plastic, polyacrylate, polyacetal, and combinations thereof.

4. The method of claim 3, further comprising admixing inert particulate in said polymer, wherein said inert particulate is selected from the group consisting of calcium carbonate, carbon black, graphite, silica fume, kaolin, magnetizable ferrite powder, metal fiber, carbon nanotubes, carbon fiber, glass fiber, fiberglass fiber, microspheres, polyimide powder, molybdenum sulfide powder, brass powder, and combinations thereof.

5. The method of claim 1 wherein said metal is a metal selected from the group consisting of steel, carbon steel, stainless steel, and aluminum.

6. The method of claim 1 wherein said etching comprises an etching process selected from the group consisting of sodium-ammonia solution etching, sodium-napthalene solution etching, plasma bombardment etching, electron-beam etching, and laser etching.

7. The method of claim 1 wherein said saturatively distributing comprises:
   (1) coating said etched surface with said aqueous admixture to provide an aqueous admixture coating having from about 0.0005 to about 0.01 inches thickness; and
   (2) pressurizing said aqueous admixture coating against said etched surface for at least 3 minutes at from about 0.5 to about 10 pounds per square inch pressure and from about 25 to about 100 degrees Centigrade temperature.

8. The method of claim 1 wherein said positioning further comprises any process selected from the group consisting of calendaring, pultrusion, multilayer extrusion, and co-injection molding.

9. The method of claim 1 wherein said tetrafluoroethylene-hexafluoropropylene-vinylidene fluoride terpolymer is from about 46.5 to about 51.5 weight percent of said fluoropolymer aqueous emulsion.

10. The method of claim 1 wherein said pH is from about 8 to about 9.

11. The method of claim 1 wherein said viscosity is from about 9 to about 10 Mega Pascal Seconds.

12. The method of claim 1 wherein said coupling agent is from about 0.05 to about 1.5 weight percent of said oxygen-radical-containing copolymer aqueous solution.

13. The method of claim 1 wherein said fluoropolymer aqueous emulsion is from about 20 to about 60 weight percent of said aqueous admixture.

14. The method of claim 1 wherein said fluoropolymer aqueous emulsion is about 50 weight percent of said aqueous admixture.

15. The method of claim 7 wherein said coating is about 0.0015 inches thick.

16. The method of claim 2 wherein said heating sustains said etched surface and said aqueous admixture on said etched surface at a temperature of at least 190 degrees Centigrade and at a pressure of at least 75 pounds per square inch for at least 10 minutes.

17. The method of claim 1, further comprising vacuum evaporating water from said aqueous admixture on said etched surface.

18. The method of claim 1 wherein said composite is a seal and said method further comprises machining a dynamic contact surface on said polytetrafluoroethylene article.

19. The method of claim 1 wherein said composite is any of a laminate diaphragm in a diaphragm pump, a gasket, an o-ring, and a hose.

* * * * *